INVENTORS
FRANCIS E. CONN
CALVIN C. COVERT
BY
W. E. Finken
THEIR ATTORNEY

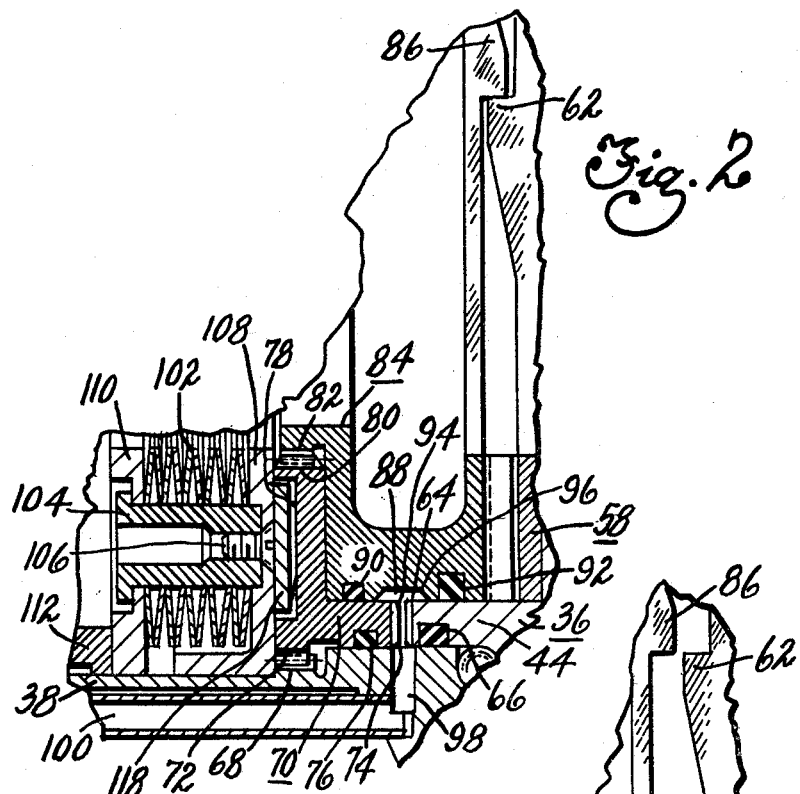
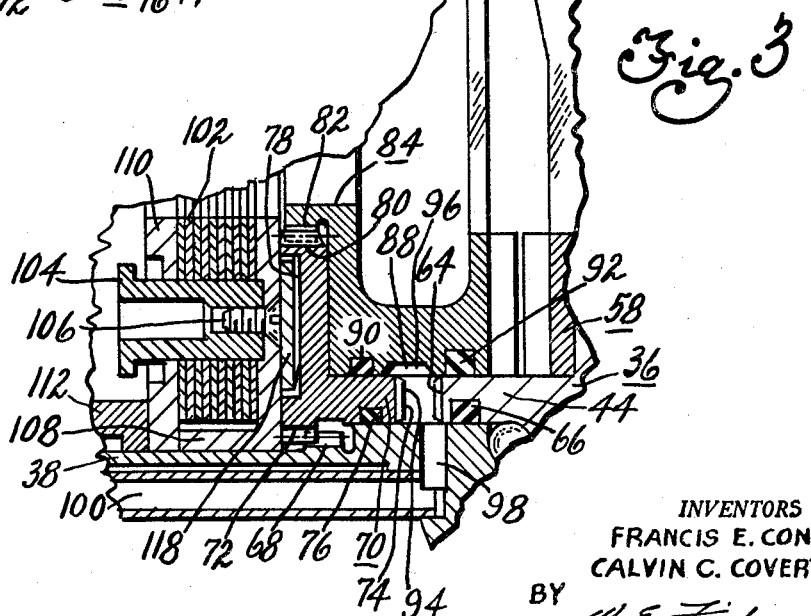

Fig. 4

United States Patent Office 3,087,554
Patented Apr. 30, 1963

3,087,554
PROPELLER MECHANICAL PITCH STOP LOCK
AND LOW PITCH STOP ASSEMBLY
Francis E. Conn, Piqua, and Calvin C. Covert, Dayton, Ohio, assignors to General Motors Corporation, Detroit, Mich., a corporation of Delaware
Filed July 11, 1960, Ser. No. 41,938
16 Claims. (Cl. 170—160.21)

This invention pertains to variable pitch propellers, and particularly to an improved combined mechanical pitch lock and low pitch stop assembly for variable pitch propellers.

Heretofore, a combined mechanical pitch lock and low pitch stop assembly has been designed wherein a pitch lock element and a pitch stop element are biased to operative positions by common spring means and released by independent servos. A combined pitch lock and pitch stop assembly of this type is disclosed in the Hirsch et al. Patent No. 2,882,975. This invention relates to an improved mechanical pitch lock and pitch stop assembly embodying common servo means for releasing the mechanical pitch lock and the mechanical low pitch stop. Accordingly, among our objects are the provision of a combined mechanical pitch lock and pitch stop assembly for a variable pitch propeller; the further provision of a combined assembly including a pitch lock element and a pitch stop element having common piston means responsive to fluid under different pressure potentials for selectively releasing only the pitch lock or both the pitch lock and the pitch stop; and the still further provision of a combined pitch lock and pitch stop assembly including spring means for engaging the pitch lock and the pitch stop and a control system for releasing the pitch lock and the pitch stop.

The aforementioned and other objects are accomplished in the present invention by embodying two-stage spring means for engaging the pitch lock and the pitch stop in combination with single piston means for selectively releasing only the pitch lock or both the pitch lock and the pitch stop in accordance with the pressure potential of fluid supplied thereto. Specifiically, the improved pitch lock and pitch stop assembly is designed for use with a propeller of the general type disclosed in copending application Serial No. 766,611 filed October 10, 1958, in the name of Francis E. Conn et al. now Patent No. 3,005,566, and assigned to the assignee of this invention.

The two-stage spring means for engaging the pitch lock and the pitch stop comprises a plurality of circumferentially spaced Belleville spring stacks confined between a stationary back plate and a movable front plate. An annular wave spring is arranged between the movable front plate and an axially movable pitch lock annulus for normally maintaining the pitch lock element engaged and constituting the first stage of the spring means. When the piston means is subjected to low pressure on the order of 400 p.s.i., the wave spring will be fully collapsed thereby disengaging the pitch lock elements. At this time the axially movable lock annulus will abut the movable front plate of the Belleville spring stack while the pitch stop elements remain in an operative position. When the pressure potential applied to the release cylinder equals or exceeds 900 p.s.i., the Belleville spring stack will be compressed thereby effecting disengagement of the pitch stop elements.

Further objects and advantages of the present invention will be apparent from the following description, reference being had to the accompanying drawings, wherein a preferred embodiment of the present invention is clearly shown.

In the drawings:

FIGURE 2 is a fragmentary view, partly in section and partly in elevation, depicting the pitch lock disengaged and the pitch stop engaged.

FIGURE 3 is a view similar to FIGURE 2 depicting both the pitch lock and pitch stop disengaged.

FIGURE 4 is a schematic diagram of a simplified fluid pressure system for controlling the combined pitch lock and pitch stop assembly of this invention.

Figure 1:
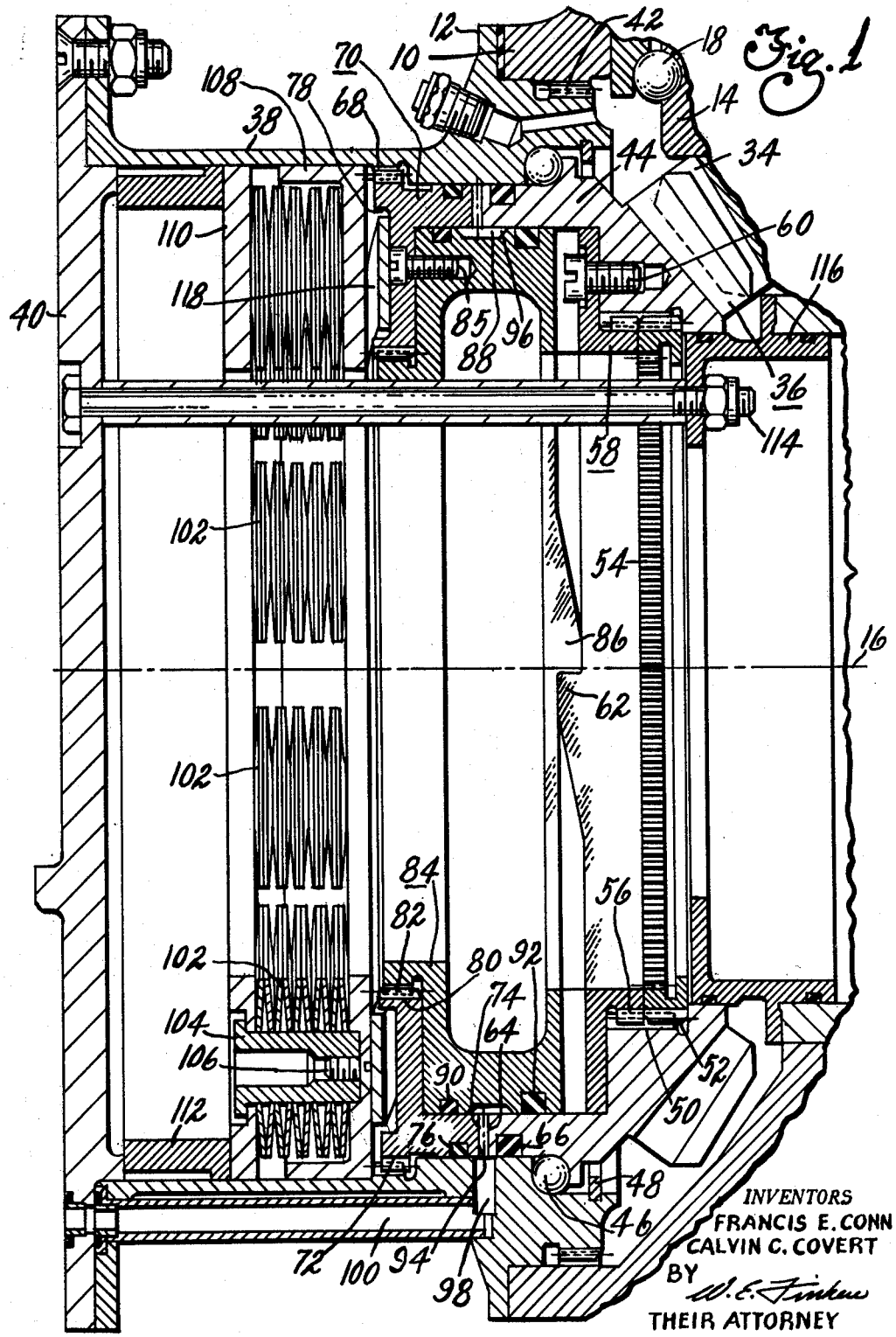
FIGURE 1 is a fragmentary view, partly in section and partly in elevation, of the combined pitch lock and pitch stop assembly of this invention.

With particular reference to the drawings, the combined mechanical pitch lock and low pitch stop assembly is disclosed in conjunction with a variable pitch propeller having a hub 10 with a plurality of radially extending sockets 12 within which propeller blades 14 are journalled for rotation about their longitudinal axes to different pitch positions. The propeller hub 10 is drivingly connected to an engine driven shaft, not shown, the horizontal propeller axis being indicated by line 16 in FIGURE 1.

Figure 4:
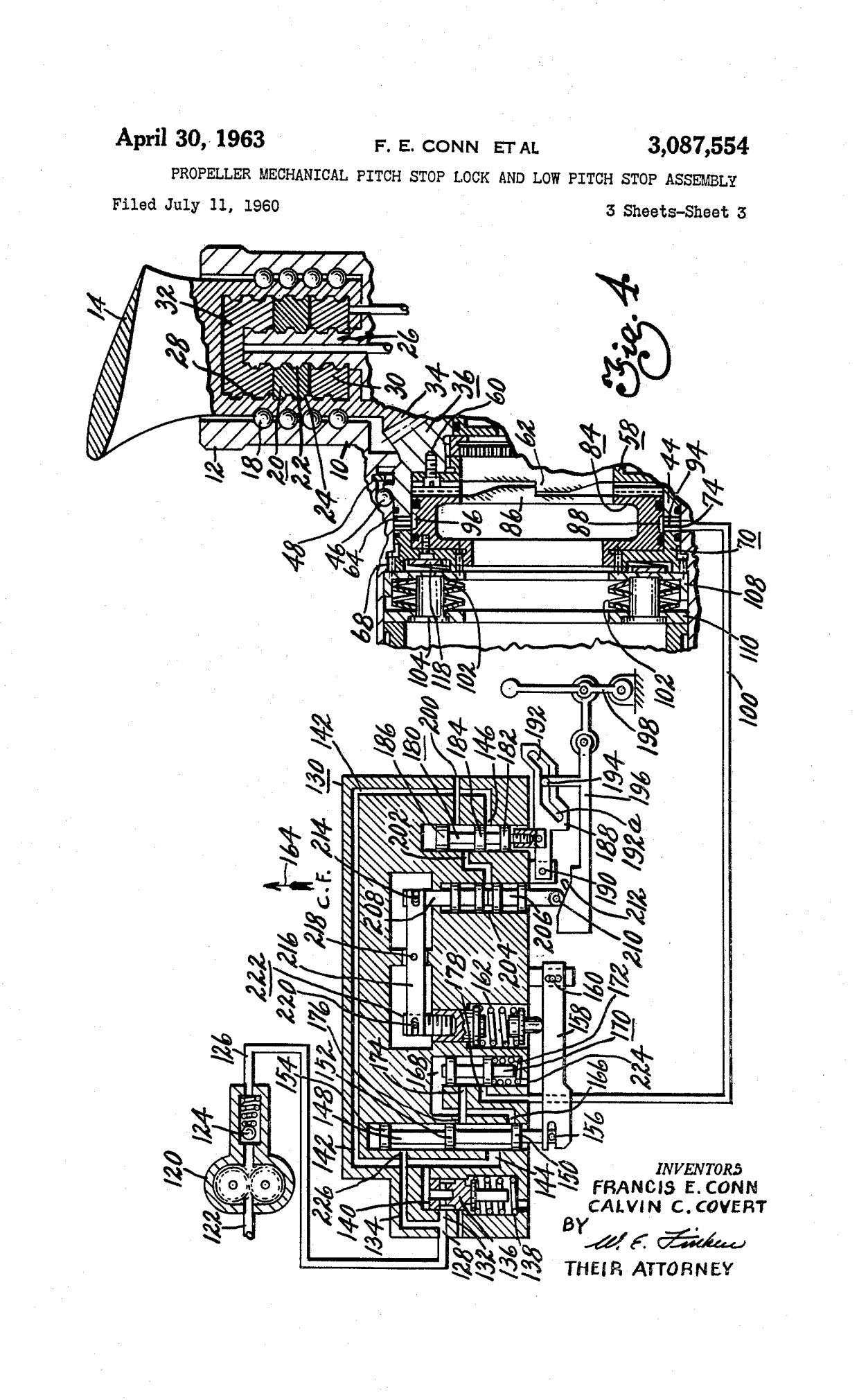

As schematically shown in FIGURE 4, each propeller blade 14 is journalled for rotation in its hub socket 12 by a combined radial and thrust stack bearing assembly 18. The root of each propeller blade 14 includes its own pitch changing motor, which structurally may be of the type shown in the Martin et al. Patent 2,500,692. Schematically, the pitch changing motor, or torque unit, includes a piston 20 having internal helical spline teeth 22 and external spline teeth 24, the internal helical spline teeth 22 engaging an externally helically splined member 26 rigidly connected to the hub 10 and the external helical spline 24 engaging internal helical splines 28 shown integral with the root of the propeller plade 14. The piston 20 is capable of fluid pressure actuation in both directions, and movement thereof effects rotation of the blade 14 about its longitudinal axis. The piston 20 divides the torque unit cylinder into an increase pitch chamber 30 and a decrease pitch chamber 32. Each propeller blade 14 is connected to a bevel gear 34 which meshes with a bevel type master gear 36 journaled for rotation relative to the hub 10 about the axis 16.

With particular reference to FIGURE 1, the master gear 36 coordinates the pitch changing movements of the several propeller blades and has a definite angular position relative to the hub for each pitch position of the propeller blades. A combined pitch lock and pitch stop housing including an annulus 38 and a front plate 40 is rigidly connected to the hub 10 by a plurality of bolts, not shown. In addition, the annulus 38 has a straight spline connection at 42 with the hub 10 whereby the pitch lock and pitch stop housing is restrained against movement relative to the hub. The master gear 36 is formed with an axially extending flange 44 having an integral bearing race for receiving ball bearing assembly 46 arranged between the flange 44 and the annulus 38 of the pitch lock and the pitch stop housing. A snap ring 48 engages a groove in the annulus 38 and prevents disassembly of the master gear 36 from the annulus 38.

The master gear 36 is formed with a set of internal straight spline teeth 50 which are engaged by external straight spline teeth 52 formed on the internally toothed feedback gear 54, constituting a component of the propeller control mechanism as disclosed in the aforementioned copending application, and external straight spline teeth 56 formed on a flanged annulus 58 constituting the rotatable low pitch stop element. The flanged annulus 58 is also connected to the master gear by a plurality of bolts, only one of which 60 is shown, and has a plurality of circumferentially spaced axially extending jaws 62 formed thereon. Since the master gear 36 has a definite angular position for each pitch position of the propeller blades 14, the pitch stop element 58 which is connected to rotate with the master gear likewise has a definite angular position for each pitch position of the propeller blades.

The end of the flange 44 on the master gear 36 is formed with a row of circumferential ratchet teeth 64, as best seen in FIGURES 2 and 3. The flange 44 with its ratchet teeth 64 constitutes the rotatable element of the mechanical pitch lock. In addition, the flange 44 is formed with an external annular groove which receives an elastomeric O-ring seal 66, the purpose of which will be pointed out more particularly hereinafter.

The annulus 38 of the pitch lock and pitch stop housing has an internally straight splined surface 68. A second flanged annulus 70 has a series of external straight splines 72 engaging the straight splines 68 whereby the annulus 70 cannot rotate relative to the pitch lock and the pitch stop housing and the hub 10, while it is free to move axially relative thereto. The annulus 70 constitutes the nonrotatable axially movable pitch locking element and thus has a circumferential row of ratchet teeth 74, as best seen in FIGURES 2 and 3. The ratchet teeth 74 are adapted to engage the ratchet teeth 64 on the flange 44 of the master gear so as to prevent rotation of the master gear 36 about the horizontal propeller axis 16 in the pitch decreasing direction of the propeller blades while permitting rotation of the master gear 36 about the axis 16 in a pitch increasing direction. The annulus 70 is likewise formed with an external annular groove which receives an elastomeric O-ring seal 76. In addition, the annulus 70 is formed with an annular groove 78 and a set of internal straight spline teeth 80.

The internal straight spline teeth 80 mate with external straight spline teeth 82 formed on a third flanged annulus 84. The spline teeth 80 and 82 preclude rotation of the annulus 84 relative to the hub 10 and sustain the torque loads imposed on the annulus 84 when the pitch stop is engaged. The annulus 84 is further connected with the annulus 70 for axial movement therewith by a plurality of bolts, one of which is indicated by numeral 85. Accordingly, the annulus 84 is rigidly connected to the annulus 70 at all times. The annulus 84 constitutes the axially movable low pitch stop element and thus has a set of circumferentially spaced jaws 86 adapted to coact with the jaws 62 on the rotatable pitch stop element 58. In addition, the annulus 84 is formed with an external annular groove 88 and carries a pair of elastomeric O-ring seals 90 and 92 on opposite sides of the annular groove 88. The annular groove 88 forms one wall of an annular cylinder, or servo chamber, 96 within which the flanged end of the annulus 70 is disposed. The flanged end of the annulus 70 constitutes a piston surface 94 responsive to fluid under pressure in the cylinder 96 which is sealed by O-rings 66, 76, 90 and 92. The cylinder 96 is connected by a radial passage 98 in the annulus 38 to a tube 100 for supplying fluid under pressure thereto.

The spring means for engaging the pitch lock elements and the pitch stop elements is located within the pitch stop and pitch lock housing and comprises ten circumferentially spaced stacks of Belleville spring washers 102. Each stack of Belleville spring washers is supported on a pin 104 connected by a bolt 106 to a movable plate 108. The springs react between the movable plate 108 and a fixed plate 110, both plates being in the form of annuli. The plate 110 is spaced from the plate 40 by a ring 112. In addition, the plate 40 is connected by a plurality of circumferentially spaced tie bolts 114 to a sleeve 116 coaxially mounted within the hub 10. Movement of the plate 108 of the Belleville spring stack is limited by engagement of the plate 108 with the ends of the straight spline teeth 68 formed on the annulus 38. A wave spring 118 is arranged between the movable plate 108 and the groove 78 of the pitch lock element 70. The wave spring 118 constitutes the first stage of the spring means for engaging the pitch lock and the pitch stop, while the Belleville spring stacks 102 constitute the second stage of the spring means.

In the illustration of FIGURE 1, both the pitch lock and the pitch stop are depicted in their engaged positions wherein the ratchet teeth 74 on the axially movable pitch lock element 70 engage the ratchet teeth 64 of the master gear 36, and the jaws 86 on the axially movable pitch stop element 84 are in operative position to engage the jaws 62 on the rotatable pitch stop element 58 so as to preclude movement of the propeller blades in the decrease pitch direction below a predetermined positive angle of for instance 18°. In FIGURE 2, the release cylinder 96 is supplied with low pressure fluid of approximately 400 p.s.i. thereby resulting in movement of the piston 94 to the left so as to disengage the pitch lock elements. Since the axially movable pitch stop element 84 is rigidly connected to the axially movable pitch lock element 70, the pitch stop element 84 is likewise moved slightly to the left from the position shown in FIGURE 1, and yet the jaws 86 and 62 are of sufficient axial extent to render the pitch stop operable to prevent movement of the propeller blades in the decreasing pitch direction below the selected low pitch angle. The wave spring 118 is fully collapsed in FIGURE 2 and the pitch stop element 70 is in engagement with movable plate 108 of the Belleville spring stack. The Belleville spring stack 102 precludes further movement of the pitch lock element 70 and the pitch stop element 84 to the left as long as only low pressure fluid is supplied to the cylinder 96.

When high pressure fluid of at least 900 p.s.i. is supplied to the cylinder 96, the piston 94 will respond and effect movement of the pitch lock element 70 and the pitch stop element 84 further to the left thereby compressing the Belleville spring stacks so as to move the jaws 86 of the pitch stop element 84 out of the path of movement of the jaws 62 on the pitch stop element 58. It will further be noted that the mechanical low pitch lock is always disengaged when the pitch stop is disengaged. However, the pitch lock can be disengaged while the pitch stop is in its operative position wherein the jaws 86 are located in the path of movement of the jaws 62.

With particular reference to FIGURE 4, a hydraulic control system for the mechanical pitch lock and mechanical pitch stop assembly will be described, this system being shown schematically. The hydraulic control system includes a pump 120 which is driven incident to propeller rotation and draws fluid through an intake 122 and delivers it through a check valve 124 to conduit 126. The output pressure of the pump 120 is in excess of 900 p.s.i. during normal operation of the propeller. The conduit 126 connects with a port 128 of a pitch lock and pitch stop control valve assembly 130. The port 128 communicates with a passage 132 and a passage 134. The passage 132 connects with a pressure reducing valve comprising a plunger 136 biased upwardly by a spring 138 and having a land 140 and internal ports and passages connecting with a low pressure passage 142. The spring 138 is calibrated to maintain a substantially constant pressure in the passage 142 of approximately 400 p.s.i. The passage 142 connects with a port 144 and a port 146. The port 144 is associated with a speed responsive plunger 148 having spaced lands 150, 152 and 154. The plunger 148 is articulated at 156 to a centrifugally responsive lever 158 having a fulcrum at 160 and engaged by a spring 162 between its ends. The valve assembly 130 is designed to be disposed in a rotatable regulator whereby the lever 158 and the plunger 148 respond to centrifugal force in the direction of arrow 164, and movement of the lever 158 and plunger 148 under centrifugal force is opposed by the spring 162. The land 150 controls a port 166 connecting with a servo chamber 168 containing a servo valve 170 biased upwardly by a spring 172. The servo valve 170 has an inlet port 174 connected to port 176 of the speed responsive valve and an outlet port 178 connected to the tube 100.

The port 146 is associated with a manually operable pitch stop control valve including a plunger 180 having spaced lands 182, 184 and 186. The plunger 180 is connected to a lever 188 pivotally connected at 190 to the valve housing and having a cam slot 92 adjacent its other end. The cam slot 192 receives a follower 194 attached to a reciprocable rod 196 capable of movement by a manual control lever 198. The pitch stop control valve is formed with a drain port 200 and an outlet port 202 connecting with a servo chamber 204. The servo chamber 204 contains a pair of plungers 206 and 208, the plunger 206 having a cam follower 210 engaging a cam surface 212 formed on the rod 196. The plungers 206 and 208 are maintained in abutting relation, and the plunger 208 is articulated at 214 at one end of a bellcrank 216 having an intermediate pivot 218 to the valve housing. The other end of the bellcrank 216 is articulated at 220 to an adjustable spring seat assembly 222 for the spring 162.

During normal propeller operation in the regime of constant speed, the manual control lever 198 is positioned to load the spring 162 where the speed setting of the speed responsive valve including the plunger 148 and the lever 158 is approximately five percent higher than the speed setting of the propeller. As the selected governing speed of the propeller is varied, the calibration of the pitch lock speed responsive valve is likewise varied through cam surface 212, the follower 210, the plungers 206 and 208, the bellcrank 216 and the adjustable spring seat assembly 222. However, if the propeller should overspeed, thereby indicating a failure in the control system, and the overspeed exceeds five percent, the lever 158 and the plunger 148 will move upwardly as viewed in FIGURE 4 whereby the land 150 will connect the port 166 to drain. When the port 166 is connected to drain, the spring 172 will move the servo valve 170 upwardly so as to connect the port 178 to drain through port 224 thereby venting the tube 100 and the release cylinder 96. Accordingly, the wave spring 118 will move the pitch lock element 70 and the pitch stop element 84 to the right as viewed in FIGURE 2 so as to engage the pitch lock and prevent further movement of the propeller blades in the pitch decreasing direction.

During normal propeller operation in the regime of constant speed, the speed sensitive valve will assume the position depicted in FIGURE 4 wherein low pressure fluid from passage 142 is supplied to the servo chamber 168 through ports 144 and 166 thereby positioning the servo valve 170 so that ports 174 and 178 are connected. Accordingly, low pressure fluid will be supplied from passage 142 through ports 144 and 176 and ports 174 and 178 to tube 100 and the release cylinder 96 so as to move the pitch lock element 70 and the pitch stop element 84 to the position of FIGURE 2 wherein the pitch lock is disengaged.

In order to disengage the mechanical low pitch stop, the manual control lever 198 must be pivoted in the clockwise direction to effect movement of the rod 196 to the right as viewed in FIGURE 4. When the rod 196 is moved to the right so that the cam follower 194 engages the right hand end of the slot 192 the plunger 180 is moved downwardly whereby ports 146 and 202 are interconnected by the annular groove between lands 184 and 186, while drain passage 200 is blocked by land 186 so that low pressure fluid will be supplied to the servo chamber 204 between the plungers 206 and 208. Since the plunger 206 engages the cam surface 212 through its follower 210, low pressure fluid in the servo chamber 204 will effect upward movement of the plunger 208 thereby pivoting the bellcrank 216 so as to increase the load on the spring 162. By increasing the load on the spring 162, the lever 158 and the plunger 148 are moved downwardly to a position where port 176 of the speed sensitive valve is connected with port 226. Since port 226 is connected to the high pressure passage 134, high pressure fluid will be supplied to the release cylinder 96 through ports 226, 176, 174, 178 and tube 100. This high pressure fluid, in excess of 900 p.s.i., will be sufficient to effect movement of the piston 94 so as to disengage the mechanical pitch stop by moving jaws 86 out of the path of movement of jaws 62 to the position shown in FIGURE 3. Under these conditions, the propellers may be operated in the beta range or in reverse.

While the embodiment of the invention as herein disclosed constitutes a preferred form, it is to be understood that other forms might be adopted.

What is claimed is as follows:

1. A combined mechanical pitch lock and low pitch stop assembly for a variable pitch propeller having a hub with a plurality of propeller blades journalled therein for rotation about their longitudinal axes and pitch changing means operatively connected to the blades for varying the pitch position thereof, including in combination, pitch coordinating means operatively connected to all of the propeller blades and rotatable about the horizontal propeller axis, said pitch coordinating means having a definite angular position for every pitch position of the propeller blades, mechanical stop means engageable with said pitch coordinating means at a predetermined angle for preventing rotation of said pitch coordinating means and the propeller blades in a decrease pitch direction, mechanical lock means engageable with said pitch coordinating means for preventing rotation of said pitch coordinating means and the propeller blades in the decrease pitch direction, and single servo means responsive to fluid under different pressures for selectively releasing the lock means alone or both the lock means and the stop means.

2. A combined mechanical pitch lock and low pitch stop assembly for a variable pitch propeller having a hub with a plurality of propeller blades journalled therein for rotation about their longitudinal axes and pitch changing means operatively connected to the blades for varying the pitch position thereof, including in combination, pitch coordinating means operatively connected to all of the propeller blades and rotatable about the horizontal propeller axes, said pitch coordinating means having a definite angular position for every pitch position of the propeller blades, mechanical stop means engageable with said pitch coordinating means at a predetermined angle for preventing rotation of said pitch coordinating means and the propeller blades in a decrease pitch direction, mechanical lock means engageable with said pitch coordinating means for preventing rotation of said pitch coordinating means and the propeller blades in the decrease pitch direction, two-stage spring means for engaging said stop means and said lock means, and single servo means responsive to fluid under different pressures for selectively releasing the lock means alone or both the lock means and the stop means.

3. A combined mechanical pitch lock and low pitch stop assembly for a variable pitch propeller having a hub with a plurality of propeller blades journalled therein for rotation about their longitudinal axes and pitch changing means operatively connected to the blades for varying the pitch position thereof, including in combination, a master gear connected to all of the propeller blades and rotatable about the horizontal propeller axis for coordinating the pitch changing movements of said blades, said master gear having a definite angular position for every pitch position of the propeller blades, an annulus connected to rotate with said master gear, mechanical stop means engageable with said annulus at a predetermined angle for preventing rotation of said annulus, said master gear and the propeller blades in a decrease pitch direction, mechanical lock means engageable with the master gear for preventing rotation of the master gear and the propeller blades in the decrease pitch direction, and single servo means responsive to fluid under different pressures for selectively releasing the lock means alone or both the lock means and the stop means.

4. A combined mechanical pitch lock and low pitch stop assembly for a variable pitch propeller having a hub with a plurality of propeller blades journalled therein for rotation about their longitudinal axes and pitch changing means operatively connected to the blades for varying the pitch position thereof, including in combination, a master gear connected to all of the propeller blades and rotatable about the horizontal propeller axis for coordinating the pitch changing movements of said blades, said master gear having a definite angular position for every pitch position of the propeller blades, an annulus connected to rotate with said master gear, mechanical stop means engageable with said annulus at a predetermined angle for preventing rotation of said annulus, said master gear and the propeller blades in a decrease pitch direction, mechanical lock means engageable with the master gear for preventing rotation of the master gear and the propeller blades in the decrease pitch direciton, two-stage spring means for engaging said stop means and said lock means, and single servo means responsive to fluid under different pressures for selectively releasing the lock means alone or both the lock means and the stop means.

5. In a variable pitch propeller having a hub with a plurality of propeller blades journalled therein for rotation about their longitudinal axes and pitch changing means operatively connected to the blades for varying the pitch position thereof, mechanical stop means operatively engageable with said blades at a predetermined pitch position thereof for preventing pitch changing movement in a decrease pitch direction, mechanical lock means operatively engageable with said blades for preventig pitch changing movement thereof in the decrease pitch direction, and single servo means responsive to fluid under different pressures for selectively releasing the lock means alone or both the lock means and the stop means.

6. In a variable pitch propeller having a hub with a plurality of propeller blades journalled therein for rotation about their longitudinal axes and pitch changing means operatively connected to the blades for varying the pitch position thereof, mechanical stop means operatively engageable with said blades at a predetermined pitch position thereof for preventing pitch changing movement in a decrease pitch direction, mechanical lock means operatively engageable with said blades for preventing pitch changing movement in the decrease pitch direction, two-stage spring means for engaging said stop means and said lock means, and single servo means responsive to fluid under different pressures for selectively releasing the lock means alone or both the lock means and the stop means.

7. A combined mechanical pitch lock and low pitch stop assembly for a variable pitch propeller having a hub with a plurality of propeller blades journalled therein for rotation about their longitudinal axes and pitch changing means operatively connected to the blades for varying the pitch position thereof, including in combination, a master gear connected to all of the propeller blades and rotatable about the horizontal propeller axes for coordinating the pitch changing movements thereof, an annulus connected to rotate with said master gear and constituting a rotatable pitch stop element having a definite angular position for every pitch position of the propeller blades, said master gear having a ratchet toothed surface constituting a rotatable pitch lock element, a second pitch stop element restrained against rotation relative to said hub but capable of axial movement into and out of engagement with rotatable first stop element, a second pitch lock element restrained against rotation relative to said hub but capable of axial movement into and out of engagement with said rotatable pitch lock element and having a complementary ratchet toothed surface, and single servo means connected with the axially movable pitch stop and pitch lock elements and responsive to fluid under different pressures for selectively disengaging the pitch lock elements alone or both the pitch lock elements and the pitch stop elements.

8. The combination set forth in claim 7 wherein said axially movable pitch lock element and said axially movable pitch stop element are rigidly connected together for movement in unison.

9. The combination set forth in claim 8 wherein said single servo means comprises an annular piston surface formed on said axially movable pitch lock element, said annular piston being disposed within an annular cylinder.

10. The combination set forth in claim 7 wherein said axially movable pitch lock element and said axially movable pitch stop element are connected for movement in unison, and two-stage spring means engaging said axially movable elements for moving said elements axially into engagement with their respective rotatable pitch stop and pitch lock elements.

11. A combined mechanical pitch lock and low pitch stop assembly for a variable pitch propeller having a hub with a plurality of propeller blades journalled therein for rotation about their longitudinal axes and pitch changing means operatively connected to the blades for varying the pitch position thereof, including in combination, means operatively connected to all of the propeller blades and rotatable about the horizontal propeller axis, said means having a definite angular position for every pitch position of the propeller blades, a first annulus restrained against rotation relative to said hub but axially movable relative thereto and constituting a pitch lock element engageable with said first recited means for preventing rotation of the propeller blades in a decrease pitch direction, a second annulus rigidly connected to said first annulus so as to be restrained against rotation relative to said hub but movable axially relative thereto in unison with said first annulus and constituting a pitch stop element engageable with said first recited means at a predetermined angle for preventing rotation of the propeller blades in the decrease pitch direction, two-stage spring means engaging said annuli for normally maintaining said annuli in engagement with said first recited means, and simple servo means responsive to fluid under different pressures for effecting axial movement of said annuli in unison to selectively disengage the pitch lock element alone from said first recited means or disengage both the pitch lock element and the pitch stop element from said first recited means.

12. The combination set forth in claim 11 wherein said two-stage spring means comprises a plurality of stacks of Belleville springs disposed between stationary and movable plates, means carried by said hub and engageable with the movable plate for limiting movement thereof and a wave spring disposed between said movable plate and said first annulus.

13. The combination set forth in claim 11 wherein said servo means comprises an annular piston integral with said first annulus and disposed in an annular cylinder.

14. In a variable pitch propeller having a hub with a plurality of propeller blades journalled therein for rotation about their longitudinal axes and pitch changing means operatively connected to the blades for varying the pitch position thereof, pitch lock means including cooperating pitch lock elements engageable in one direction, one of said pitch lock elements being rotatable with respect to said hub during pitch changing movements of the blades and the other of said pitch lock elements being fixed against rotation relative to said hub, pitch stop means including cooperating jaw elements engageable in one direction for preventing pitch changing movement of said blades at a predetermined angular position thereof, one of said pitch stop elements being rotatable with respect to said hub during pitch changing movement of the blades and the other of said pitch stop elements being fixed against rotation relative to said hub, a high pressure fluid source, a low pressure fluid source, single servo means responsive to fluid under different pressures for disengaging the pitch lock elements alone or disengaging both the pitch lock elements and the pitch stop elements, means for suplying low pressure fluid to said single servo means to disengage said pitch lock elements, means to supply high pressure fluid to said single servo means to disengage the pitch stop elements as well as the pitch lock elements, and two-stage spring means responsive to predetermined reductions in the pressure acting on said single servo means for engaging the pitch stop elements alone, or both the pitch stop elements and the pitch lock elements.

15. The combination set forth in claim 14 wherein the means for supplying low pressure fluid to said single servo means includes a speed sensitive valve.

16. The combination set forth in claim 15 wherein the means for supplying high pressure fluid to said single servo means includes a manually controlled valve, said speed sensitive valve, and means operable by said manually controlled valve for biasing said speed sensitive valve from a first position wherein the speed sensitive valve supplies low pressure fluid to said single servo means to a second position wherein said speed sensitive valve supplies high pressure fluid to said single servo means.

References Cited in the file of this patent

UNITED STATES PATENTS

| | | |
|---|---|---|
| 2,855,057 | Van Alstyne | Oct. 7, 1958 |
| 2,882,975 | Hirsch et al. | Apr. 21, 1959 |
| 2,955,663 | Brandes et al. | Oct. 11, 1960 |
| 2,957,528 | Flaugh et al. | Oct. 25, 1960 |
| 3,003,567 | Flaugh et al. | Oct. 10, 1961 |
| 3,024,848 | Chilman et al. | Mar. 13, 1962 |